United States Patent [19]

Richards et al.

[11] Patent Number: 5,392,071
[45] Date of Patent: Feb. 21, 1995

[54] APPARATUS AND METHOD FOR PROCESSING IMAGE DATA

[75] Inventors: John W. Richards, Chilbolton; Stephen M. Keating, Lower Earley; Jonathan J. Stone, Mortimer, all of United Kingdom

[73] Assignee: Sony United Kingdom Ltd., Staines, United Kingdom

[21] Appl. No.: 31,902

[22] Filed: Mar. 16, 1993

[30] Foreign Application Priority Data

May 13, 1992 [GB] United Kingdom ............... 9210261

[51] Int. Cl.6 ....................... H04N 7/12; H04N 11/04
[52] U.S. Cl. ..................... 348/398; 348/437; 348/438
[58] Field of Search ............. 358/141, 140, 133, 138, 358/11, 12, 183, 182, 22, 185, 135, 136; H04N 7/04, 7/01, 5/2, 7/12, 11/20, 11/04, 11/06; 348/392, 397, 398, 397, 438, 441, 458

[56] References Cited

U.S. PATENT DOCUMENTS

| | | | |
|---|---|---|---|
| 4,829,378 | 5/1989 | LeGall | 358/141 |
| 4,903,125 | 2/1990 | Parker | 358/141 |
| 4,918,524 | 4/1990 | Ansari et al. | 358/133 |
| 4,969,204 | 11/1990 | Melnychuck et al. | |
| 5,029,002 | 7/1991 | Citta et al. | 358/141 |
| 5,128,791 | 7/1992 | LeGall et al. | 358/141 |
| 5,220,422 | 6/1993 | Oh | 358/133 |

FOREIGN PATENT DOCUMENTS

0133026 2/1985 European Pat. Off. .
0260997 3/1988 European Pat. Off. .

OTHER PUBLICATIONS

Patent Abstracts of Japan vol. 15, No. 40 (E-1028) 30 Jan. 1991 & JP-A-22 76 383 (Sony Corp).
IEEE Transactions on Consumer Electronics vol. 34, No. 3, Aug. 1988, New York, N.Y. US, pp. 474-483 Fisch 'Bandsplitting of video signals for 2-channel transmission' p. 474, column 2, line 8-line 18; FIG. 1.1.

*Primary Examiner*—James J. Groody
*Assistant Examiner*—Michael H. Lee
*Attorney, Agent, or Firm*—William S. Frommer; Alvin Sinderbrand

[57] ABSTRACT

Image processing apparatus is described in which a source stream of data captured by a particular source is passed through a data splitter where it is split using one splitting technique into a plurality of split streams of data. These split streams of data each contain only part of the information within the source stream of data. The split streams of data are separately manipulated by a post production unit prior to being passed through a data combiner where they are recombined to form an output stream of data. The source stream of data and the output stream of data are of a higher resolution than the individual split streams of data. The post production unit includes at least one reformatter for reformatting the data stream to use a different splitting technique matched to the manipulation being performed in the post production unit.

14 Claims, 12 Drawing Sheets

SHR FRAME A

APPARATUS AND METHOD FOR PROCESSING IMAGE DATA

BACKGROUND OF THE INVENTION

1. Field of the Invention

This invention relates to the processing of image data.

2. Description of the Prior Art

The processing of image data is a well established technical field. Image data can be captured in many different forms. For example, image data may be captured by still/moving image photographic cameras or still/moving image electronic cameras. Once the image data has been captured, it is typically transformed into a stream of data according to a known image data format, such as PAL, NTSC, SECAM or SMPTE 240M.

There exist many different pieces of equipment for performing manipulations upon image data in the aforementioned formats. The manipulations can take many different forms. For example, the manipulation may be recording onto magnetic tape, processing through a digital video effects system, motion compensated standards conversion or spatial filtering.

As the technical field of the capture, manipulation and reproduction of image data has advanced, this has made possible the use of increasingly high resolution systems. At the present time this technical field is at the start of a transitional period between the use of formats such as PAL, NTSC and SECAM and the use of a new generation of high definition of video formats.

A major obstacle that stands in the way of such evolution is the vast amount of investment and development effort that must be expended to produce apparatus for manipulating data in these new higher resolution formats. As spatial and temporal resolution increases the rate at which image data must be handled increases to an extent that the sophistication of the equipment used must be significantly increased so as to cope. This is a hugely expensive undertaking.

One possible way in which the use of higher resolution formats may be facilitated is to split the source stream of data into a number of separate split streams of data each having only part of the information content of the source stream of data. The lowering of the information content of the split streams of data may be sufficient to allow existing or slightly modified equipment, originally designed for use with lower resolution formats, to be employed. This technique can be thought of as providing a hierarchial philosophy in which systems of increased resolution can be built from combining pieces of equipment that were originally produced for lower resolution operation.

Whilst the above is a superficially attractive approach, it brings with it its own set of problems which must be solved if its use is to be practical. In particular, the splitting, manipulation and combining of the data can introduce distortions into the image data that did not occur, or were not relevant, when the lower resolution equipment was being used upon data in the format for which it was originally intended.

It is an object of the invention to provide apparatus for processing image data adopting the above described hierarchial philosophy that has a reduced level of distortions due to the splitting, manipulation and combining of the data.

SUMMARY OF THE INVENTION

The invention provides apparatus For processing image data, said apparatus comprising:

(i) an image data source for generating a source stream of data representing an image;

(ii) a data splitter for splitting said source stream of data into a plurality of split streams of data each representing a part of the information content of said source stream of data;

(iii) manipulation means for performing a manipulation upon said plurality of split streams of data; and (iv) a data combiner for combining said plurality of split streams of data into an output stream of data; wherein (v) said manipulation means includes at least one reformatter for reformatting said plurality of split streams of data such that the information content of said source stream of data is split between said plurality of split streams according to a different technique that is matched to a manipulation to be applied to said plurality of split data streams.

The invention both recognizes and solves the problem that differing ways of splitting the image data are suited to some, but not other, forms of manipulation prior to recombination. The provision of a system in which the manipulation means includes at least one reformatter greatly increases the versatility of the system whilst only incurring a minor increase in complexity.

It will be appreciated that the data splitter and data combiner may use many different splitting techniques. An 'ad hoc' approach could be used to provide whatever interfaces were needed between different items of manipulation apparatus so as to change the data splitting format. This would however cause problems by preventing a uniform approach to monitoring the signal at different points along the processing chain.

A better approach is to provide a uniform format for the exchange of data between manipulation apparatus and then provide each manipulating apparatus requiring other than this uniform format with reformatters at its input and output to reformat out of and then back in to the uniform format. The differing splitting techniques that may be used each have associated advantages and disadvantages. Splitting the data by sub sampling is simple to implement, but the monitor signals are generally not of high quality. Splitting the data by tiling is still relatively easy to implement and has the advantage that standard concealment of errors can be used, but has the disadvantage that monitoring is not that straight forward and edge effects may be visible upon recombination.

In preferred embodiments of the invention said data splitter includes means for splitting said source stream of data into a plurality of streams of two dimensional spatial frequency sub band data and said data combiner includes means for combining said plurality of streams of two dimensional spatial frequency sub band data to form said output stream of data. Splitting the data on a spatial frequency basis can be achieved by using relatively simple and inexpensive filters. Furthermore, since each sub band has its edge corresponding to the edge of the full image, this approach is not prone to introducing edge effect errors into the central part of the reconstructed image.

The sub band splitting technique is particularly suitable when said manipulation means includes an image data recorder for separately recording said plurality of streams of two dimensional spatial frequency sub band data and monitor means for reproducing a monitor image during partial replay from that stream of two dimensional sub band data having the lowest two dimensional spatial frequencies. The monitoring of the image is of critical importance when carrying out tasks such as editing with manipulations from a digital video effects unit and this feature allows one of the recorded channels to be used to provide a good quality monitor image.

In particularly preferred embodiments of the invention said data splitter is operable to provide that stream of two dimensional sub band data having the lowest two dimensional spatial frequencies with a signal format suitable for direct reproduction by a television receiver. This feature allows the sub band data having the lowest two-dimensional spatial frequencies to be directly tapped and displayed upon a conventional television receiver. This monitor image will be of a lower resolution than the source stream of data, but it is quite sufficient for the function of locating particular points within an image data stream.

Whilst sub band splitting has advantages in circumstances such as those described above, it suffers from the limitation that any manipulation that alters the spatial frequency of any of the data in the split streams of data would introduce a gross distortion on recombination. Furthermore, any manipulation involving spatial filtering would have a disadvantageously decreased resolution due to the decreased spatial resolution of the individual split streams of data upon which it would operate.

Accordingly, in preferred embodiments of the invention said at least one reformatter includes means for reformatting said plurality of split streams of data into a plurality of streams of data each representing a different area within an image.

This reformatting recovers the full spatial resolution within each of the split streams of data that may be required for the manipulation concerned. Embodiments of the invention with a reformatter capable of providing tiled data are particularly suitable when said manipulation means includes a spatial filtering means for performing spatial filtering separately upon said plurality of streams of data representing different areas of an image.

Another reformatting operation is provided by embodiments in which said at least one reformatter includes means for reformatting said plurality of split streams of data into a plurality of streams of sub sampled data. Such splitting prior to manipulation helps avoid edge effects in the centre of the picture and is not subject to the rigid requirement that the spatial frequency of the split streams of data must not be altered.

If it is desired that the manipulations should be carried out in real time, then one class of preferred embodiments provide that said manipulation means has a multi-channel architecture with said plurality of split streams of data each being manipulated in a different channel so as to provide real time manipulation of said image data.

Alternatively, if real time operation is not required, then preferred hardware efficient embodiments of the invention are such that said data splitter outputs a multiplexed stream of data comprising a sequence of contemporaneous portions of said plurality of split streams of data, said manipulation means performing non real time manipulation upon said multiplexed stream of data.

The invention also provides a method of processing image data, said method comprising the steps of:
(i) generating a source stream of data representing an image;
(ii) splitting said source stream of data into a plurality of split streams of data each representing a part of the information content of said source stream of data;
(iii) reformatting said plurality of split streams of data such that the information content of said source stream of data is split between said plurality of split streams of data according to a different technique that is matched to a subsequent manipulation;
(iv) performing a manipulation upon said plurality of split streams of data; and
(v) combining said plurality of split streams of data into an output stream of data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
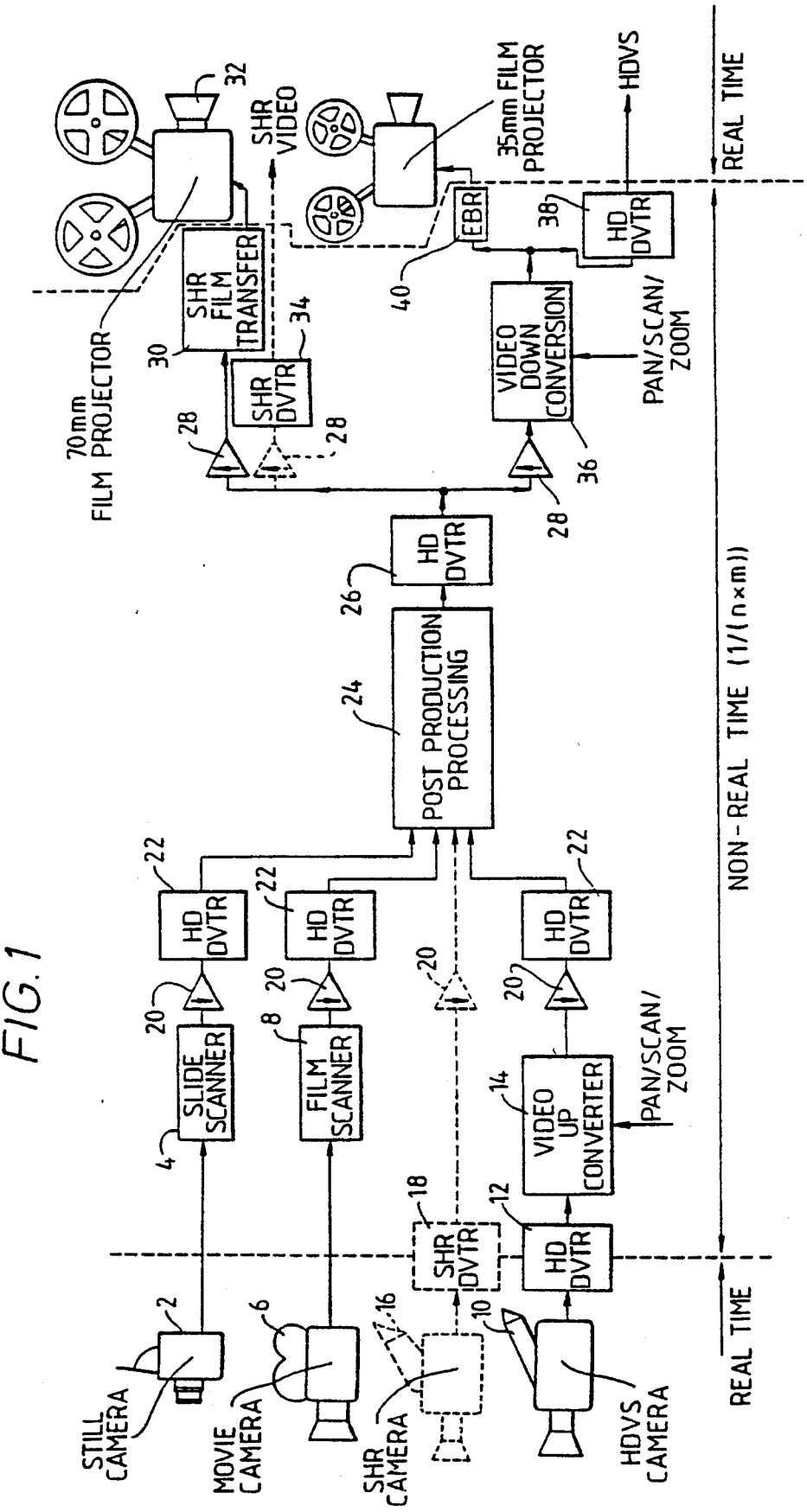
FIG. 1 illustrates a non real time system for manipulating image data with equipment originally designed for manipulating image data of a lower information content.

FIG. 1 illustrates a system for the non real time manipulation of image data. Various apparatus for generating the source stream of image data is illustrated. These include: a still image photographic camera 2 and a slide converter 4; a movie camera 6 and a film scanner 8; a high definition moving image electronic camera 10, a high definition digital video tape recorder 12 and a video data mixer 14; and a super high resolution moving image electronic video camera 16 and a super high resolution digital video tape recorder 18 (illustrating the hierarchial manner in which the system can cope with increased resolution equipment developed in the future).

The image capture of these devices takes place in real time. Subsequent processing in this embodiment takes place in non real time. The factor by which the processing time is reduced is approximately equal to the number of streams into which the data is split.

The non real time source stream of data from one of the slide scanner 4, the film scanner 8 or the video data mixer 14 is fed to a respective data splitter 20. The split streams of data from the data splitter 20 take the form of a multiplexed stream of data comprising a sequence of contemporaneous portions of each of the split streams, e.g. the image data from a single frame may be split into four separate streams which are then output in sequence from the data splitter 20. The non real time multiplexed data streams from the data splitter 20 are recorded on a high definition digital video tape recorder 22. In the case of the super high resolution camera 16 and the super high resolution digital video tape recorder 18, the super high resolution digital video tape recorder captures the image data in real time but plays it back through the data splitter 20 in non real time.

The split data is then fed to a post production processing unit 24. This post production processing unit can be a standard piece of high definition equipment such as a high definition video effects unit or high definition filtering system. Alternatively, in some embodiments the manipulation being performed could be the storage on magnetic media by the high definition digital video tape recorder 22.

The output from the post production processing unit 24 is fed to a further high definition digital video tape recorder 26 via which it is passed to a data combiner 28. The data combiner 28 combines the split streams of data into an output stream of data. This can then be passed through a super high resolution film transfer unit 30 onto a 70 mm film projection system 32 or direct to a super high resolution video channel 34. Alternatively, the combined output stream of data could be split again with accompanying pan/scan/zoom operations by a video down conversion system 36 and then displayed via a standard high definition channel 38 or placed onto 35 mm film by an electron beam recorder 40.

Figure 2:
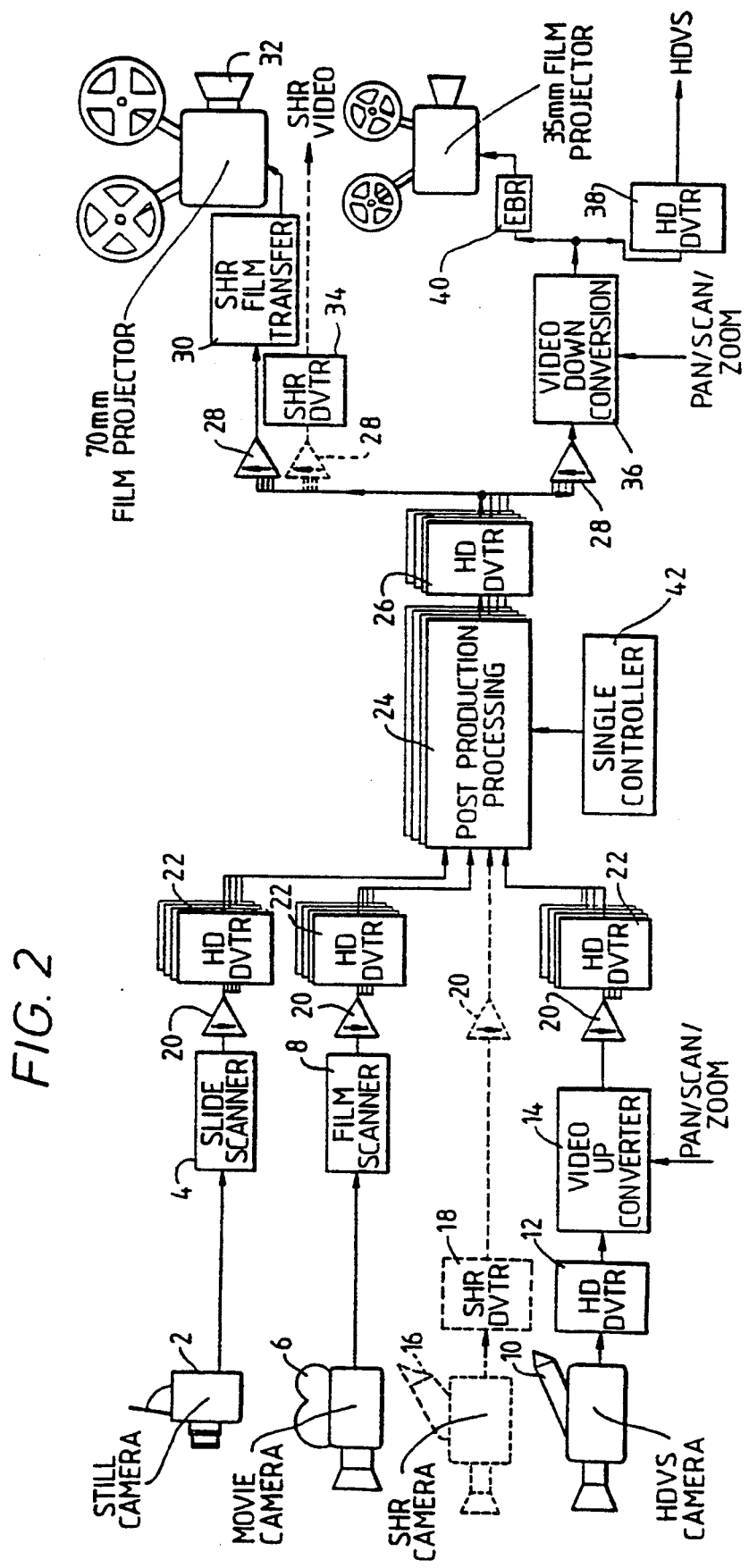
FIG. 2 illustrates a real time system for manipulating image data with equipment originally designed for manipulating image data of a lower information content.

FIG. 2 shows a system for the real time manipulation of image data. The difference between this system and that of FIG. 1 is that between the data splitters 20 and the data combiners 28 there exists a multi channel architecture comprising four post production processing units 24 with corresponding banks of high definition video tape recorders 22 and 26. It will be appreciated that the four post production processing units 24 must have a coordinated operation and so a controller 42 is provided to synchronise their operation. For example, if the post production processing unit is performing a fade or wipe operation then it is important that this should progress at the same rate for each of the split streams of data if distortion upon recombination is to be avoided.

Figure 3:
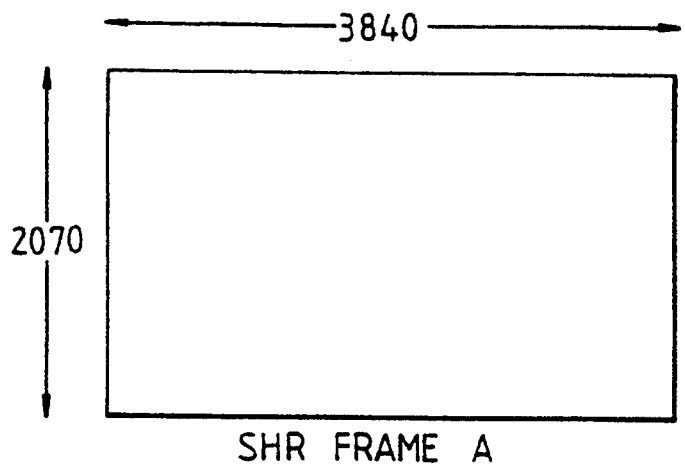
FIGS. 3 and 4 illustrate a sub band splitting technique.

FIG. 3 illustrates a super high resolution frame of video data. This is approximately four times the resolution of current high definition video (two times horizontal and two times vertical) and has 2007 horizontal lines each composed of 3840 pixels.

Figure 4:
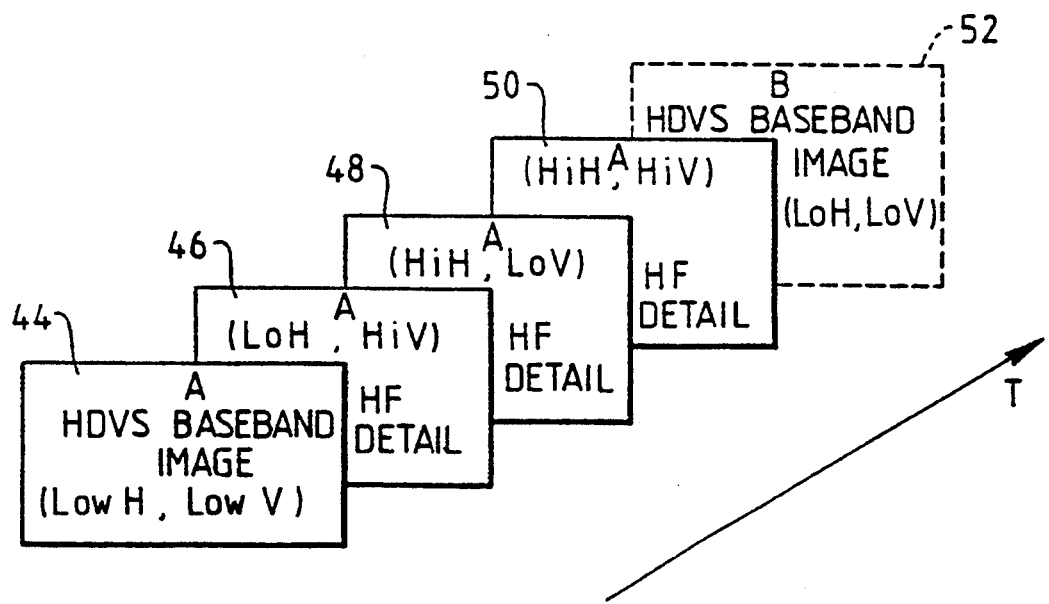

FIG. 4 illustrates how the super high resolution frame of FIG. 3 may be split into four two dimensional spatial frequency sub bands. In this example, the image is split into low and high frequency components both horizontally and vertically. Sub band 44 is the low horizontal and low vertical frequency component. Sub band 46 is the low horizontal and high vertical frequency component. Sub band 48 is the high horizontal and low vertical frequency component. Sub band 50 is the high horizontal and high vertical frequency component. It will be appreciated that since the super high resolution frame of FIG. 3 has essentially double the horizontal and vertical spatial frequency of a standard high definition video frame, the splitting by a factor of four will mean that the sub band 44 in fact represents a high definition base band image. Sub band 52 is the first sub band of the next frame of image data.

Figure 5:
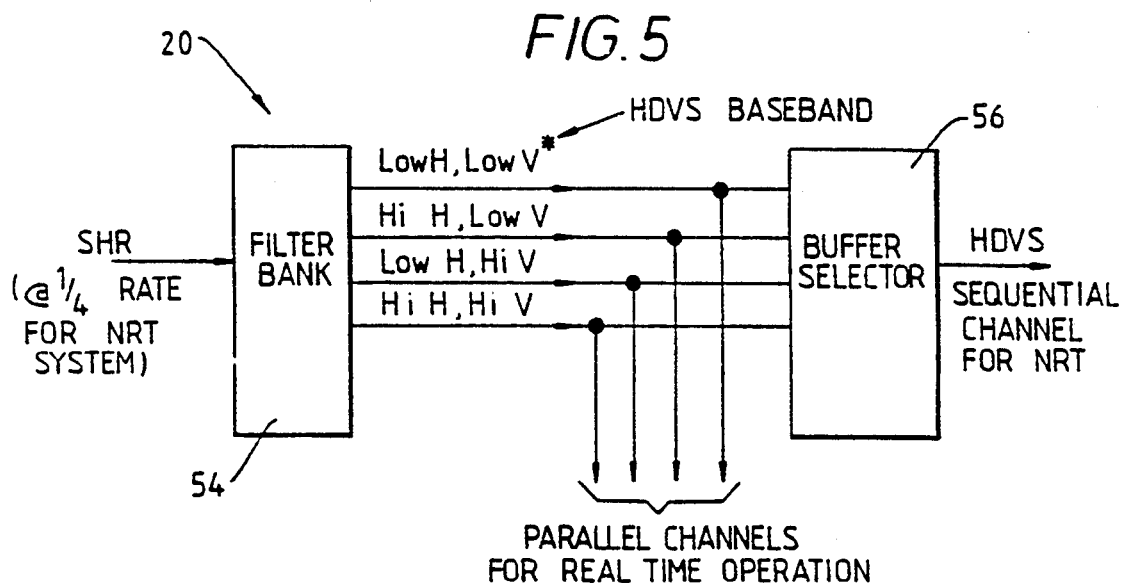
FIG. 5 illustrates a data splitter for use with the sub band splitting technique.

FIG. 5 illustrates a data splitter 20 For sub band splitting. The super high resolution source stream of data is fed into a filter bank 54. In the case of non real time system, this data is fed in at a ¼ normal rate. The filter bank 54 comprises an array of finite impulse response filters of the known type For decimating and frequency separating the input data stream. The output from the filter bank 54 is four parallel split streams of data each representing a different spatial frequency sub band. In the case of the real time system of FIG. 2, these split streams of data are fed in parallel to the multi channel post production processing system. In the case of the non real time system they are fed to a buffer and selector unit 56 where they are collected and sequentially fed onto the single high definition video channel for post production processing with the system of FIG. 1.

Figure 6:
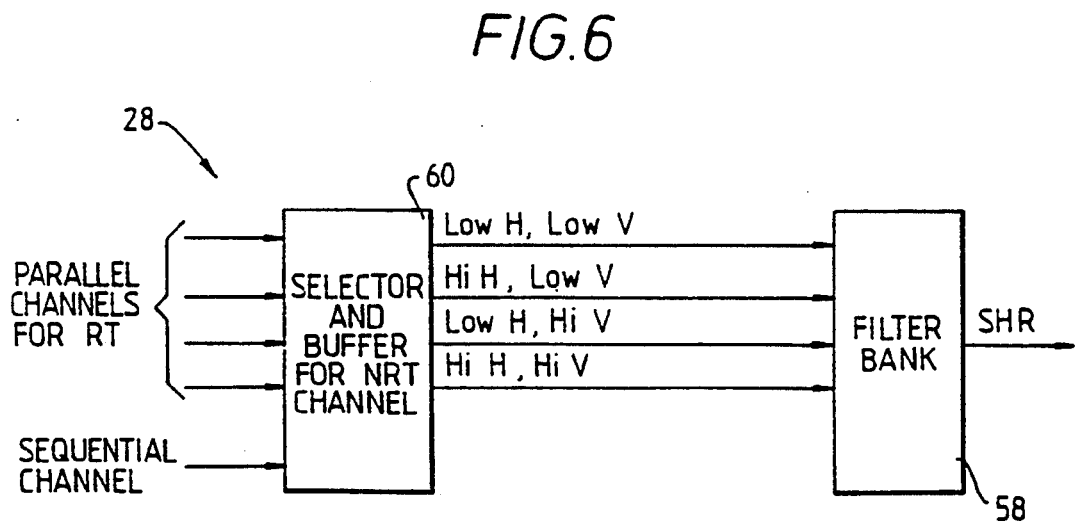
FIG. 6 illustrates a data combiner for use with the sub band splitting technique.

FIG. 6 shows a data combiner 28 for use with split streams of data produced with the sub band splitting technique. In a real time system the split streams of data are fed in parallel to a filter bank 58 where they are combined and interpolated into a super high resolution signal. For the real time system the parallel channels pass through a selector and buffer unit 60 without modification. In the case of a non real time system the multiplexed split streams of data are fed via a sequential channel to the selector and buffer unit 60 where they are fed into appropriate buffer stores for subsequent parallel output to the filter bank 58 during the next frame period whilst another set of buffers are receiving the split streams for that next frame.

Figure 7:
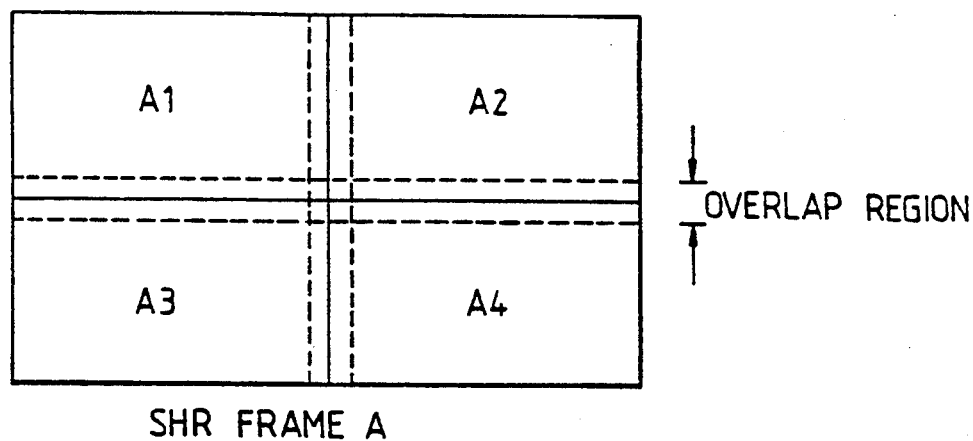
FIGS. 7 and 8 illustrate a tiling splitting technique.

FIG. 7 illustrates the splitting of a super high resolution frame with a tiling splitting technique. Different portions of the image A1, A2, A3 and A4 are formed in respective quadrants. It will be seen that these quadrants overlap. This overlapping is to facilitate the removal of edge effect distortions when the quadrants are subsequently recombined.

Figure 8:
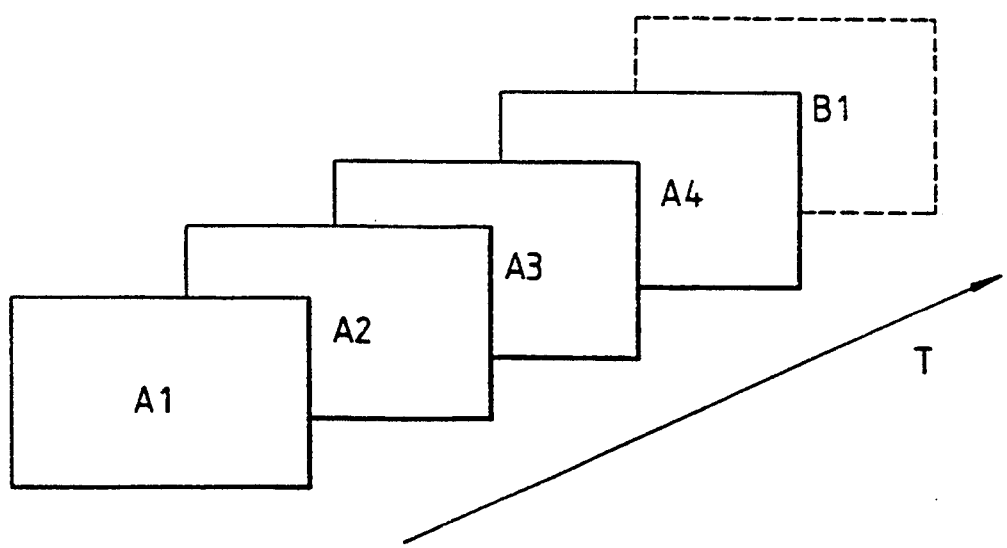

FIG. 8 illustrates the split streams of data formed with this tiling splitting technique. Each stream of data represents a respective quadrant from within the super high resolution frame of FIG. 7. Quadrant B1 represents the upper left hand quadrant of the subsequent super high resolution frame.

Figure 9:
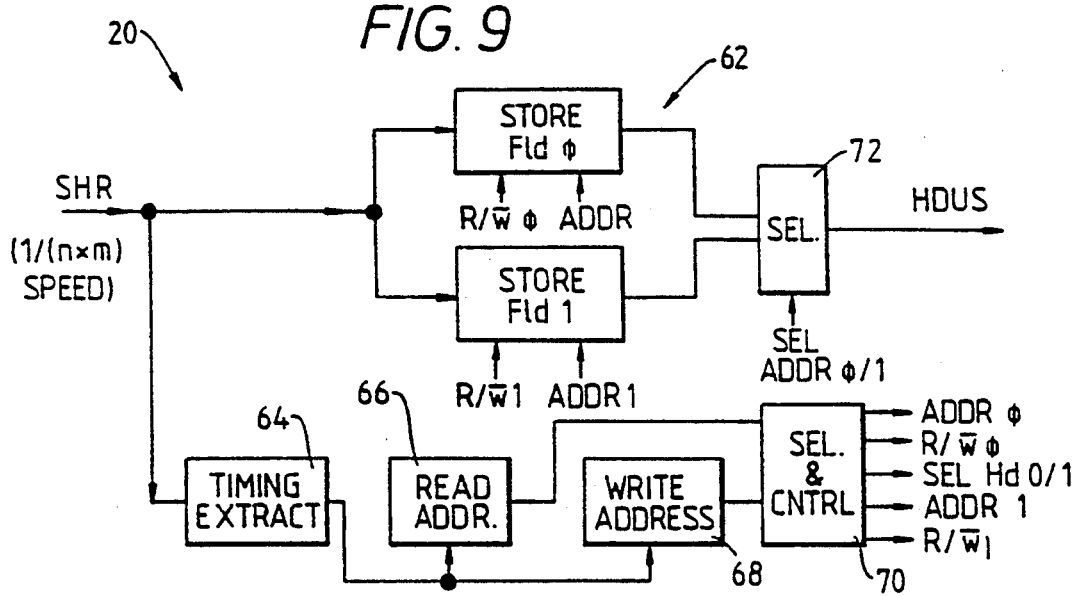
FIG. 9 illustrates a data splitter for use with the tiling splitting technique or a sub sampling splitting technique.

FIG. 9 illustrates a non real time data splitter 20 for use with either tiling or sub sampling splitting. The super high resolution data is fed to a swing buffer arrangement 62. Respective frames of the super high resolution data are stored in respective frame stores on either side of the swing buffer 62. A timing circuit 64 extracts the timing and synchronisation information from the super high resolution signal. This timing circuit controls the operation of a read address generator 66 and a write address generator 68. The read address generator 66 and the write address generator 68 can comprise incrementing counters addressing appropriately programmed PROMs for mapping the incrementing count into a predetermined sequence of addresses within the frame stores of the swing buffer 62. Whilst a current frame of super high resolution data is being fed into one of the frame stores under control of the write address generator 68, the data from the previous frame is being read out of the other frame store under control of the read address generator 66.

It will be appreciated that with appropriate programming of the PROMs the data can be read into the frame stores in its normal raster scan pattern but read out in any sequence and order that is desired. For example, the data can be read out as four raster scanned quadrants in the case of tiling splitting or in a raster scanned spatially sub sampled sequence in the case of sub sampling splitting as will be discussed later.

A select and control unit 70 responsive to the respective read and write addresses is used to supply the appropriate signals to the control inputs of the frame stores and to an output selector 72.

Figure 10:
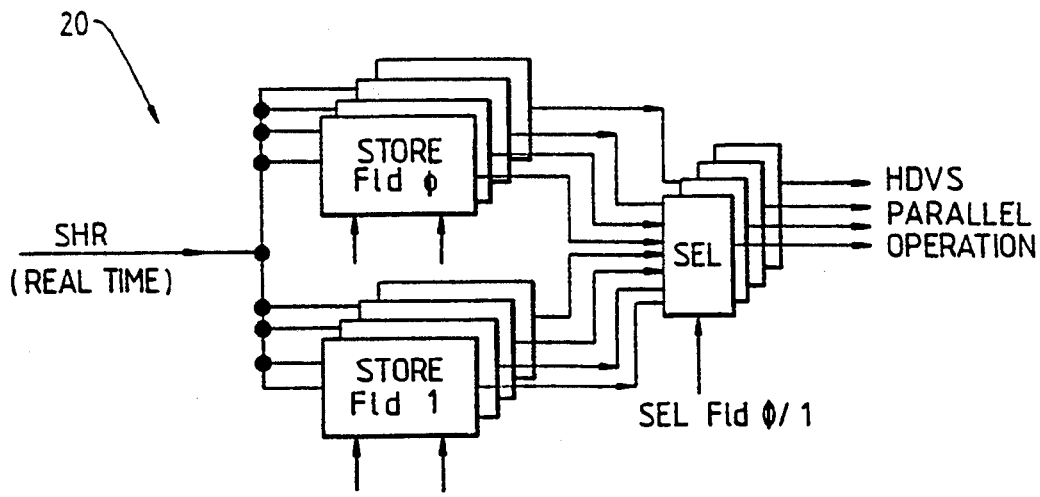
FIG. 10 illustrates a data combiner for use with the tiling or sub sampling splitting techniques.

FIG. 10 illustrates a real time version of the data splitter of FIG. 9. In this case four parallel swing buffers are provided. The splitting can take place on either the input side or output side of the frame stores. The full image could be written into each frame store and then the appropriate pixels thereof read out under control of the predetermined sequence of read addresses. Alternatively, only those pixels for a particular split data stream could be read into each of the frame stores and then all of these read out in parallel with a simple incrementing read address.

Figure 11:
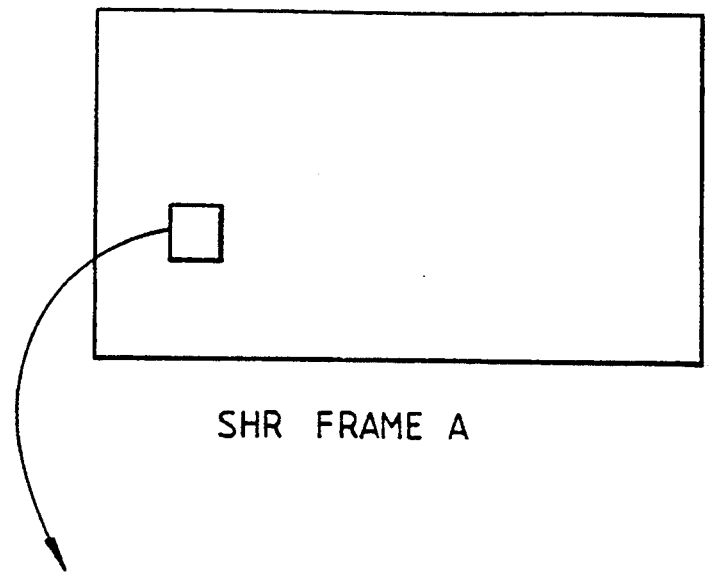
FIGS. 11 and 12 illustrate the sub sampling splitting technique.

FIG. 11 illustrates a sub sampling splitting technique. The pixels from a small section of a super high resolution frame are shown in magnified schematic form at the bottom of FIG. 11. The pixels for the respective split streams of data are shown as o, Δ, ∇, and □. It will be seen that the pixels forming each of the split streams of data effectively sub sample the full super high resolution frame in a regular array.

Figure 12:
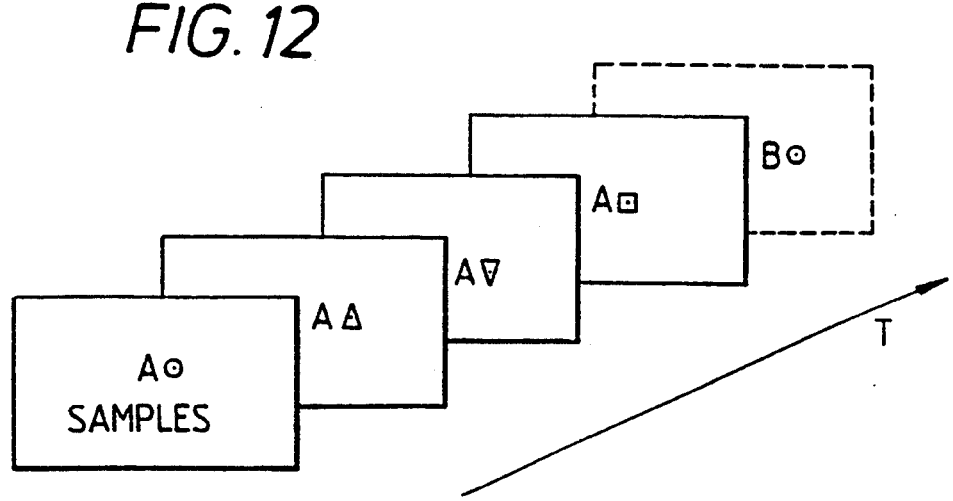

FIG. 12 shows the split streams of data collected together. Respective split streams comprise all the o, Δ, ∇ and □ pixels from one super high resolution frame.

It will be understood that the data splitters of FIGS. 9 and 10 can be readily adapted by an appropriate address mapping in the address generators 66, 68 to perform the sub sampling of FIGS. 11 and 12 rather than the tiling of the previous splitting technique.

Figure 13:
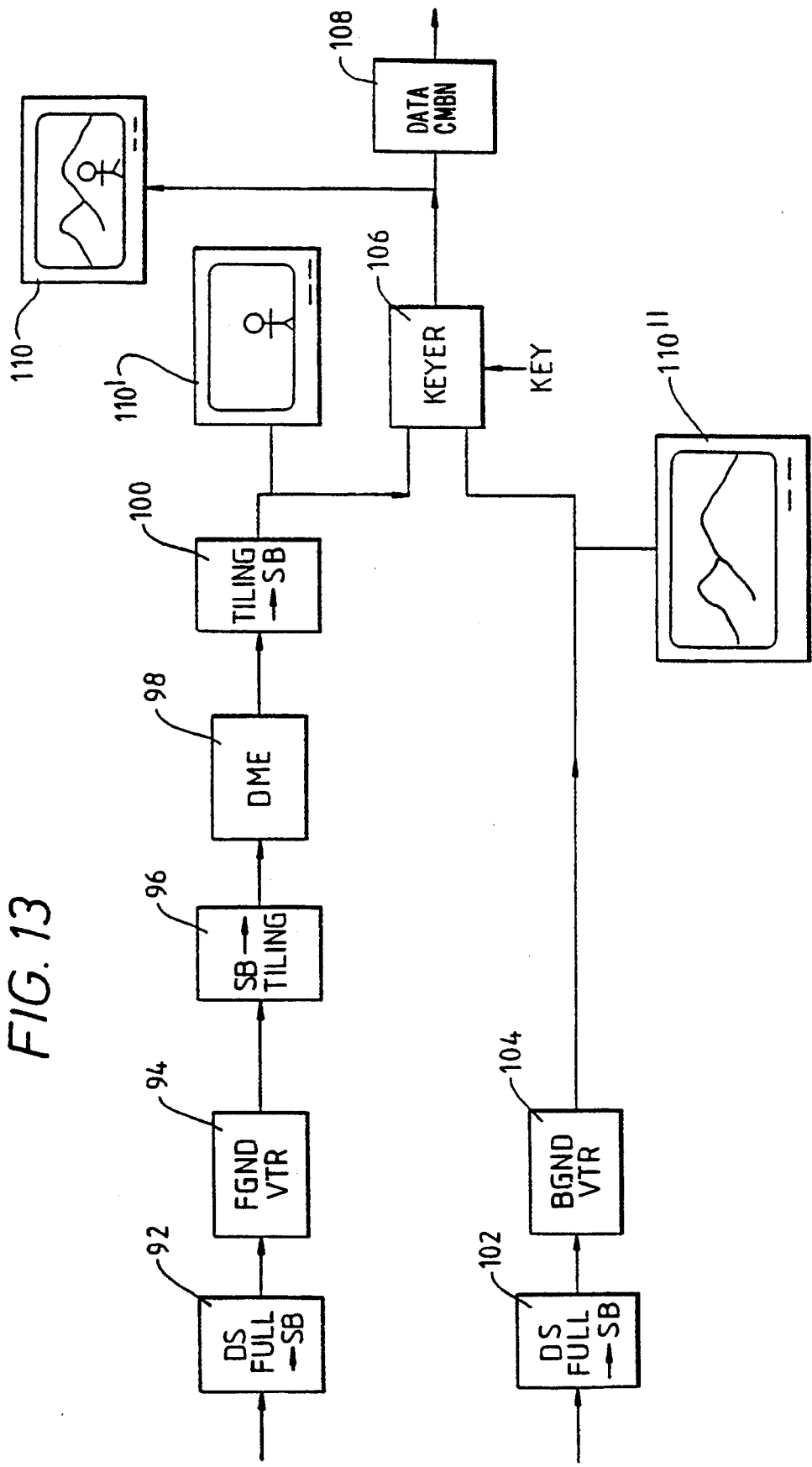
FIG. 13 illustrates a manipulation means with reformatters.

FIG. 13 illustrates a manipulation means For manipulating a foreground image and keying it into a background image. A data splitter 92 splits the foreground image data stream into a series of consecutive sub band image as shown in FIG. 4 (sub band splitting is, in this embodiment, used as the uniform data exchange format between manipulation apparatus). These sub band images are then stored on a video tape recorder 94. It is desired that the foreground image be scaled prior to combination with the background image. This scaling will alter the spatial frequencies within the image and accordingly cannot be carried out in the sub band domain. To overcome this, a reformatter 96 converts the data from a sub band format to a tiled format as illustrated in FIG. 7. The output from the reformatter 96 is then scaled in the digital multiple effects unit 98 prior to being reformatted back into sub band format by the reformatter 100.

On a second channel, a background image is split into sub band format by a data splitter 102 prior to being stored on a video tape recorder 104. The outputs from the reformatter 100 and the video tape recorder 104 are fed to the inputs of a keyer 106 where they are keyed together in the sub band domain under the control of a keying signal prior to being combined into an output data stream by a data combiner 108.

A monitor 110 is provided to read the LowH, LowV sub band (see FIG. 4) so as to provide feedback to the operator as to the results of the DME scaling and keying manipulations.

It will be appreciated that the reformatters 96, 100 can be constructed using the data splitters and data combiners described above in relation to FIGS. 5, 6, 9 and 10. The reformatter 96 (sub band to tiled) can be formed as a sub band combiner in series with a tiling splitter and the reformatter 100 (tiled to sub band) as a tiling combiner in series with a sub band splitter.

Figure 14:
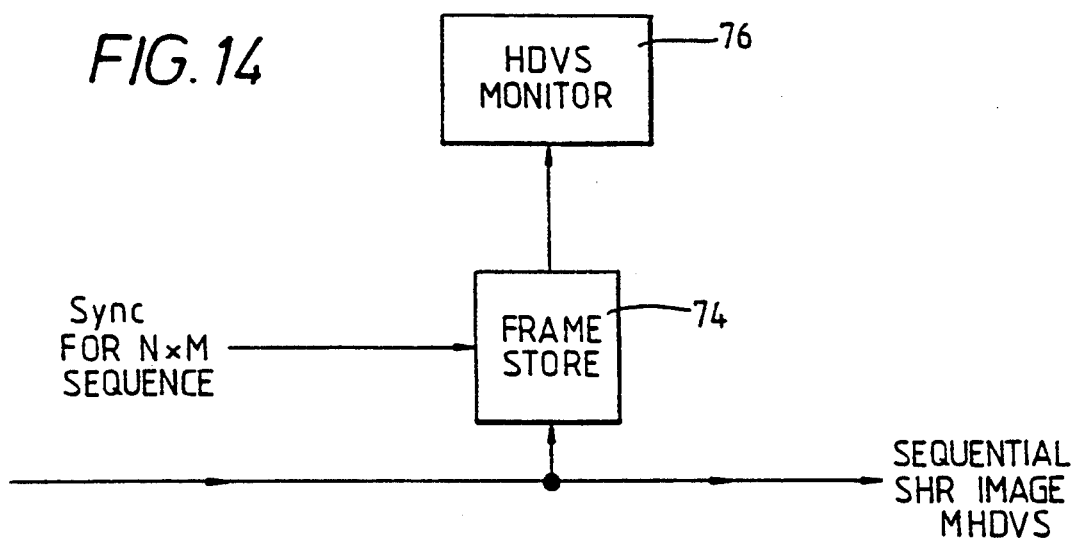
FIG. 14 illustrates non real time monitoring of a data stream split with the sub band technique.

FIG. 14 illustrates the monitoring of non real time sub band split data. The sequential stream of multiplexed sub band data is selectively sampled into a frame store 74. The sync input to the frame store 74 ensures that it is the low frequency horizontal and low frequency vertical sub band data that is captured in the frame store 74. This particular sub band, as previously mentioned, represents a base band high definition video signal that can be directly used to drive a standard high definition monitor 76.

Figure 15:
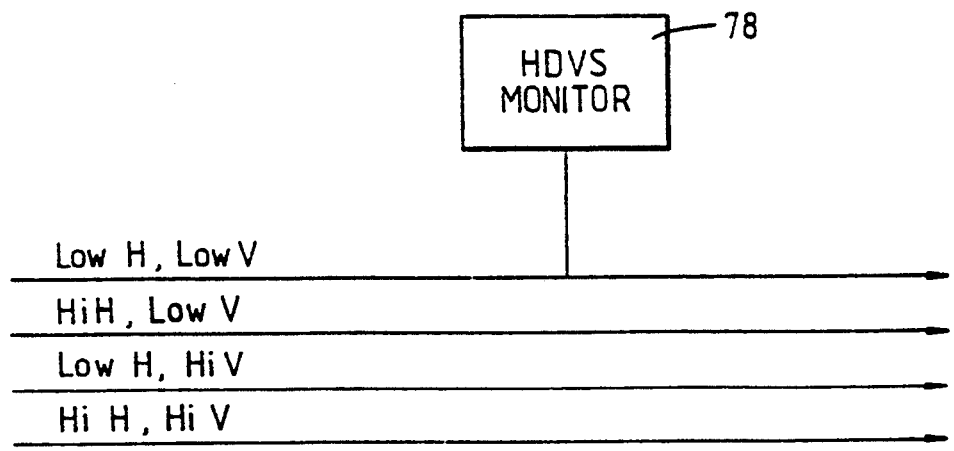
FIG. 15 illustrates a real time monitoring of a data stream split with the sub band technique.

FIG. 15 illustrates monitoring in a real time sub band splitting system. In this system the low frequency horizontal and low frequency vertical sub band data be can directly tapped to a high definition monitor 78 with no need for the buffering of the frame store 74 from the non real time system.

Figure 16:
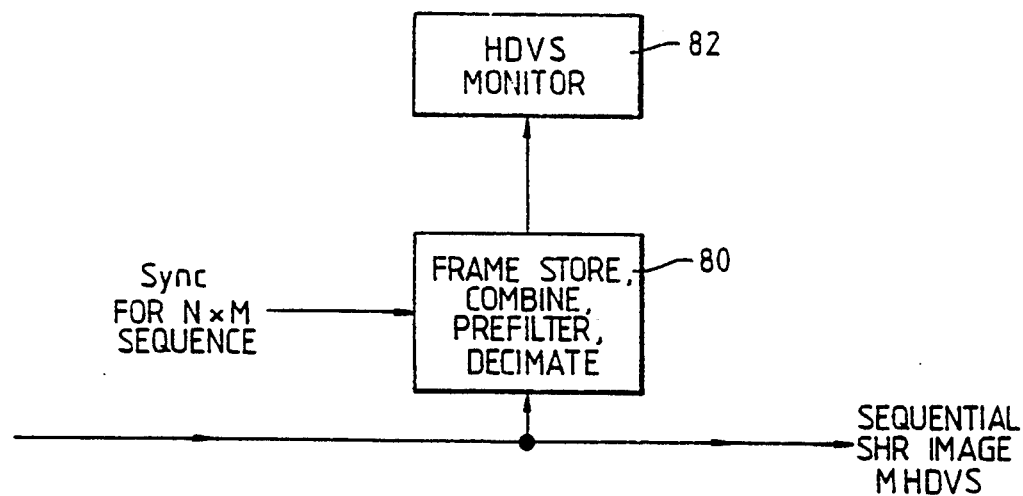
FIG. 16 illustrates non real time monitoring of a data stream split with the tiling splitting technique.

FIG. 16 illustrates monitoring in a non real time tiling splitting system. Successive quadrants of a source image frame are captured in a frame store 80. This captured data is then refiltered to remove any edge effects and decimated down to a high definition signal which can then be used to drive a high definition monitor 82.

Figure 17:
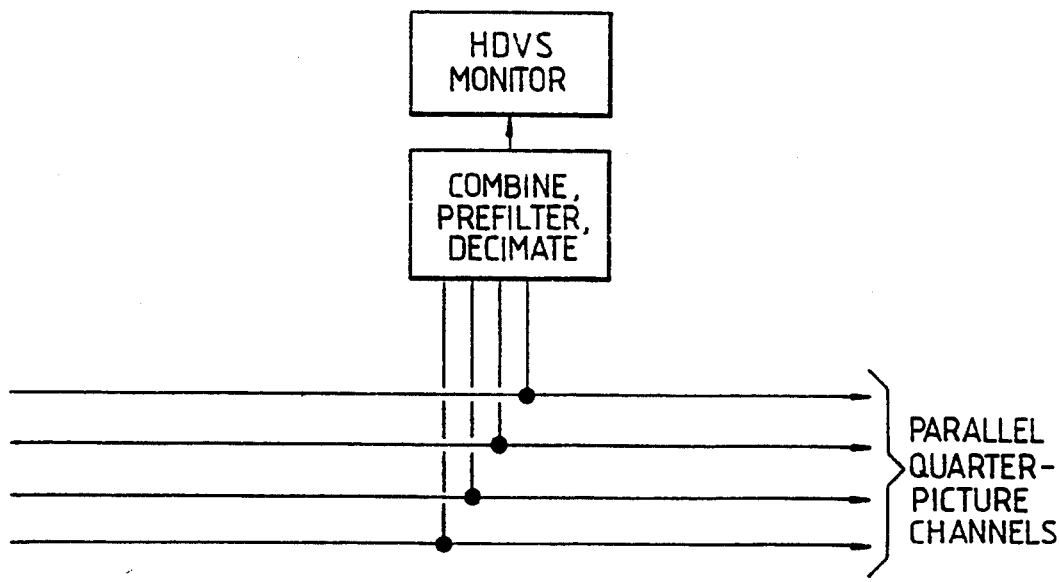
FIG. 17 illustrates a real time monitoring of a data stream split with the tiling splitting technique.

FIG. 17 shows monitoring in a real time tiling splitting system. In this case the quadrants are captured in parallel, but otherwise the steps of combination, refiltering and decimation are the same.

Figure 18:
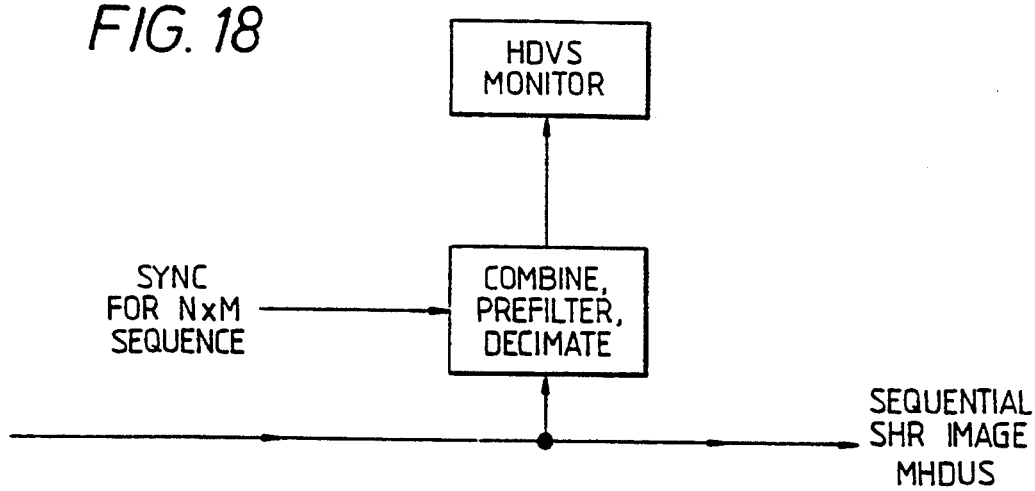
FIG. 18 illustrates non real time monitoring of a data stream split with the sub sampling splitting technique.
Figure 19:
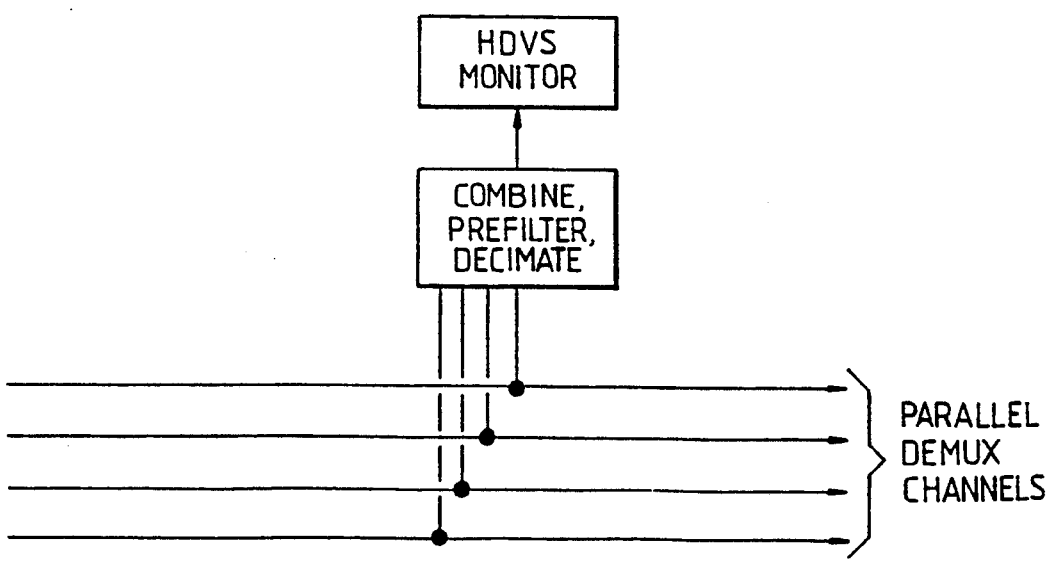
FIG. 19 illustrates a real time monitoring of a data stream split with the sub sampling splitting technique.

FIGS. 18 and 19 respectively illustrate non real time and real time monitoring in a sub sampling splitting system. These monitoring systems are substantially the same as those of FIGS. 15 and 16 other than the data is in a different order within each split stream.

Figure 20:
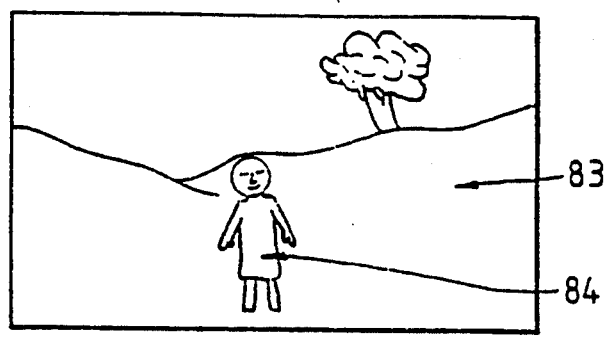
FIGS. 20, 21 and 22 illustrate example picture manipulations.
Figure 21:
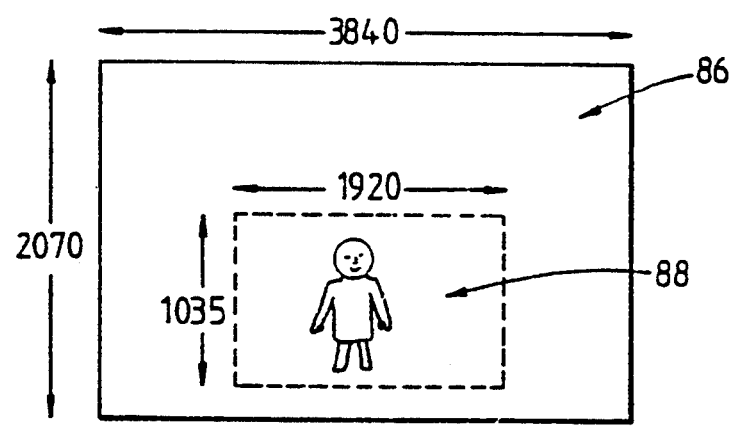
Figure 22:
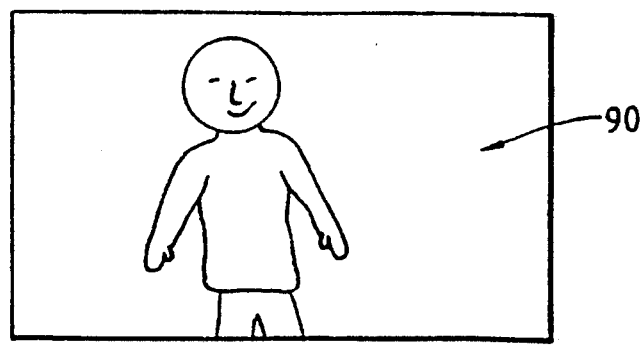

FIGS. 20, 21 and 22 illustrate possible post production manipulations that may be performed. All the images are of a super high resolution format of the form illustrated in FIG. 3. FIG. 19 has a background 83 formed of an expanded and defocused high definition image with a foreground image 84 subsequently matted on at its full super high resolution.

FIG. 21 shows a super high resolution background 86 with a high definition foreground 88 matted on at its full high definition resolution.

FIG. 22 shows a high definition image that has been magnified horizontally and vertically to fill a full super high resolution frame 90.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing image data, said apparatus comprising:

image data source means for generating a source stream of data representing an image;

data splitter means for splitting said source stream of data into a first plurality of split streams of data according to a first technique, each of said first plurality of split streams representing a part of the information content of said source stream of data;

first reformatter means for reformatting said first plurality of split streams of data into a second plurality of split streams of data according to a second technique different than said first technique, said second technique being matched to an image manipulation to be applied to said second plurality of split streams of data;

manipulation means for performing said image manipulation upon said second plurality of split streams of data; and data combiner means for combining said second plurality of split streams of data, as manipulated, into an output stream of data.

2. Apparatus as claimed in claim 1, further comprising second reformatter means for reformatting said second plurality of split streams of data, as manipulated, into a third plurality of split streams of data that have the format of said first plurality of split streams of data and that are combined by said data combiner means.

3. Apparatus as claimed in claim 1, wherein said first plurality of streams of data are in the format of two dimensional spatial frequency sub band data.

4. Apparatus as claimed in claim 3, wherein said manipulation means includes image data recorder means for separately recording said first plurality of streams of two dimensional spatial frequency sub band data and monitor means for reproducing a monitor image during partial replay of a stream of recorded two dimensional sub band data having the lowest two dimensional spatial frequencies.

5. Apparatus as claimed in claim 3, wherein said data splitter means is operable to provide that stream of two dimensional sub band data having the lowest two dimensional spatial frequencies in a signal format suitable for direct reproduction by a television receiver.

6. Apparatus as claimed in claim 1, wherein each of said second plurality of split streams of data represents a different area within said image represented by said source stream of data.

7. Apparatus for processing image data, said apparatus comprising:

image data source means for generating a source stream of data representing an image;

data splitter means for splitting said source stream of data into a first plurality of split streams of data each representing a part of the information content of said source stream of data according to a first technique;

manipulation means for performing a manipulation upon said first plurality of split streams of data, said manipulation means including at least one reformatter for reformatting said first plurality of split streams of data into a second plurality of split streams of data in which the information content of said source stream of data is split according to a second technique that is matched to a manipulation to be applied to said second plurality of split streams of data, said second technique being different than said first technique, said at least one reformatter including means for reformatting said first plurality of split streams of data into said second plurality of split streams of data each representing a different area within an image, said manipulation means also including spatial filtering means for performing spatial filtering separately upon said second plurality of streams of data representing different areas of an image; and data combiner means for combining said second plurality of split streams of data, as spatially filtered, into an output stream of data.

8. Apparatus as claimed in claim 1, wherein said second plurality of split streams of data are in a format of streams of sub sampled data.

9. Apparatus for processing image data, said apparatus comprising:

image data source means for generating a source stream of data representing an image;

data splitter means for splitting said source stream of data into a first plurality of split streams of data each representing a part of the information content of said source stream of data according to a first technique;

manipulation means for performing a manipulation upon said first plurality of split streams of data and including at least one reformatter for reformatting said first plurality of split streams of data into a second plurality of split streams of data in which the information content of said source stream of data is split according to a second technique that is matched to a manipulation to be applied to said second plurality of split streams of data, said second technique being different than said first technique, said manipulation means having a multi-channel architecture with said first plurality of split streams of data each being manipulated in a different channel so as to provide real time manipulation of said image data; and data combiner means for combining said second plurality of split streams of data, as manipulated, into an output stream of data.

10. Apparatus for processing image data, said apparatus comprising:

image data source means for generating a source stream of data representing an image;

data splitter means for splitting said source stream of data into a first plurality of split streams of data each representing a part of the information content of said source stream of data according to a first technique and for outputting a multiplexed stream of data comprising a sequence of contemporaneous portions of said first plurality of split streams of data;

manipulation means for performing non real time manipulation upon said multiplexed stream of data and including at least one reformatter for reformatting said multiplexed stream of data into a second plurality of split streams of data in which the information content of said source stream of data is split according to a second technique that is matched to a manipulation to be applied to said second plurality of split streams of data, said second technique being different than said first technique; and data combiner means for combining said second plurality of split streams of data, as manipulated, into an output stream of data.

11. A method of processing image data, said method comprising the steps of:

generating a source stream of data representing an image;

splitting said source stream of data into a first plurality of split streams of data according to a first technique, each of said first plurality of split streams representing a part of the information content of said source stream of data;

reformatting said first plurality of split streams of data into a second plurality of split streams of data according to a second technique different than said first technique, said second technique being matched to an image manipulation to be applied to said second plurality of split streams of data;

performing said manipulation upon said second plurality of split streams of data; and combining said second plurality of split streams of data, as manipulated, into an output stream of data.

12. Apparatus as claimed in claim 1, wherein said data splitter means is operative to produce said first plurality of split streams of data in a sub band format, and said first reformatter means is operative to reformat said first plurality of split streams of data to produce said second plurality of split streams of data in a tiled format.

13. Apparatus as claimed in claim 1, wherein said first reformatter means includes combining means for combining said first plurality of split streams of data to produce a combined data stream and means for splitting said combined data stream into a second plurality of split streams of data according to a second technique different than said first technique.

14. Apparatus as claimed in claim 1, wherein said manipulation means is operative to perform video special effect processing on said second plurality of split streams of data.

* * * * *